(12) United States Patent
Portolani et al.

(10) Patent No.: US 8,532,116 B2
(45) Date of Patent: Sep. 10, 2013

(54) EXTENDED SUBNETS

(75) Inventors: Maurizio Portolani, Rolle (CH); Christian Elsen, Rolle (CH)

(73) Assignee: Cisco Technology, Inc., San Jose, CA (US)

( * ) Notice: Subject to any disclaimer, the term of this patent is extended or adjusted under 35 U.S.C. 154(b) by 1018 days.

(21) Appl. No.: 12/460,614

(22) Filed: Jul. 21, 2009

(65) Prior Publication Data

US 2011/0019676 A1 Jan. 27, 2011

(51) Int. Cl.
*H04L 12/28* (2006.01)
*H04L 12/56* (2006.01)
*H04L 12/46* (2006.01)
*G06F 9/50* (2006.01)

(52) U.S. Cl.
CPC ........ *H04L 12/4633* (2013.01); *H04L 12/4641* (2013.01); *G06F 9/5077* (2013.01)
USPC ...................... 370/395.53; 709/223; 709/226

(58) Field of Classification Search
CPC ....... H04L 45/00; H04L 45/66; H04L 45/586; H04L 12/4633; H04L 12/4641; G06F 9/5077
USPC ............ 370/254, 389, 392, 395.53; 709/238
See application file for complete search history.

(56) References Cited

U.S. PATENT DOCUMENTS

| | | | | |
|---|---|---|---|---|
| 6,157,647 A * | 12/2000 | Husak | ........................... | 370/401 |
| 7,577,143 B1 * | 8/2009 | Kompella | ..................... | 370/392 |
| 2004/0228335 A1 * | 11/2004 | Park et al. | ..................... | 370/352 |
| 2005/0097223 A1 * | 5/2005 | Shen et al. | .................... | 709/245 |
| 2006/0251101 A1 * | 11/2006 | Zhang et al. | .................. | 370/437 |
| 2008/0186968 A1 | 8/2008 | Farinacci et al. | | |
| 2008/0225875 A1 * | 9/2008 | Wray et al. | ................... | 370/419 |
| 2009/0260083 A1 * | 10/2009 | Szeto et al. | ..................... | 726/22 |
| 2011/0119748 A1 * | 5/2011 | Edwards et al. | ............... | 726/12 |

OTHER PUBLICATIONS

"Data Center Infrastructure Design Guide 2.5", published by Cisco on Dec. 2007, www.cisco.com/application/pdf/en/us/guest/netsol/ns107/c649/ccmigration_09186a008073377d.pdf.
"Data Center High Availability Clusters Design Guide", published by Cisco on Feb. 20, 2006, http://www.cisco.com/en/US/docs/solutions/Enterprise/Data_Center/HA_Clusters/HA_Clusters.html.
RFC 3931 standard entitled "Layer Two Tunneling Protocol—Version 3", by J. Lau, et al. Mar. 2005.
RFC 4761 standard entitled "Virtual Private LAN Service (VPLS) Using BGP for Auto-Discovery and Signaling" by K. Kompella, et al. Jan. 2007.
RFC 4762 standard entitled "Virtual Private LAN Service (VPLS) Using Label Distribution Protocol (LDP) Signaling" by M. Lasserre, et al. Jan. 2007.
"Data Center-Site Selection for Business Continuance", published by Cisco, http://www.cisco.com/en/US/docs/solutions/Enterprise/Data_Center/dcstslt.html 1992.

* cited by examiner

*Primary Examiner* — Ayaz Sheikh
*Assistant Examiner* — Tarell Hampton
(74) *Attorney, Agent, or Firm* — Baker Botts L.L.P.

(57) ABSTRACT

There is provided a router for use in a datacenter, the router including a frame receiving module operative to receive a traffic frame and a frame forwarding module operative to forward the traffic frame to a second router in a second datacenter if a Destination Media Access Control (DMAC) address included in the traffic frame is different from all of the following:
  a Burned in Address of the router;
  a Burned in Address of at least one server associated with the router;
  a Media Access Control (MAC) address of one of a Hot Standby Routing Protocol (HSRP) group and a Virtual Router Redundancy Protocol (VRRP) group of the router; and
  a MAC address of one of a HSRP group and a VRRP group of a subnet hosted by the router.

14 Claims, 4 Drawing Sheets

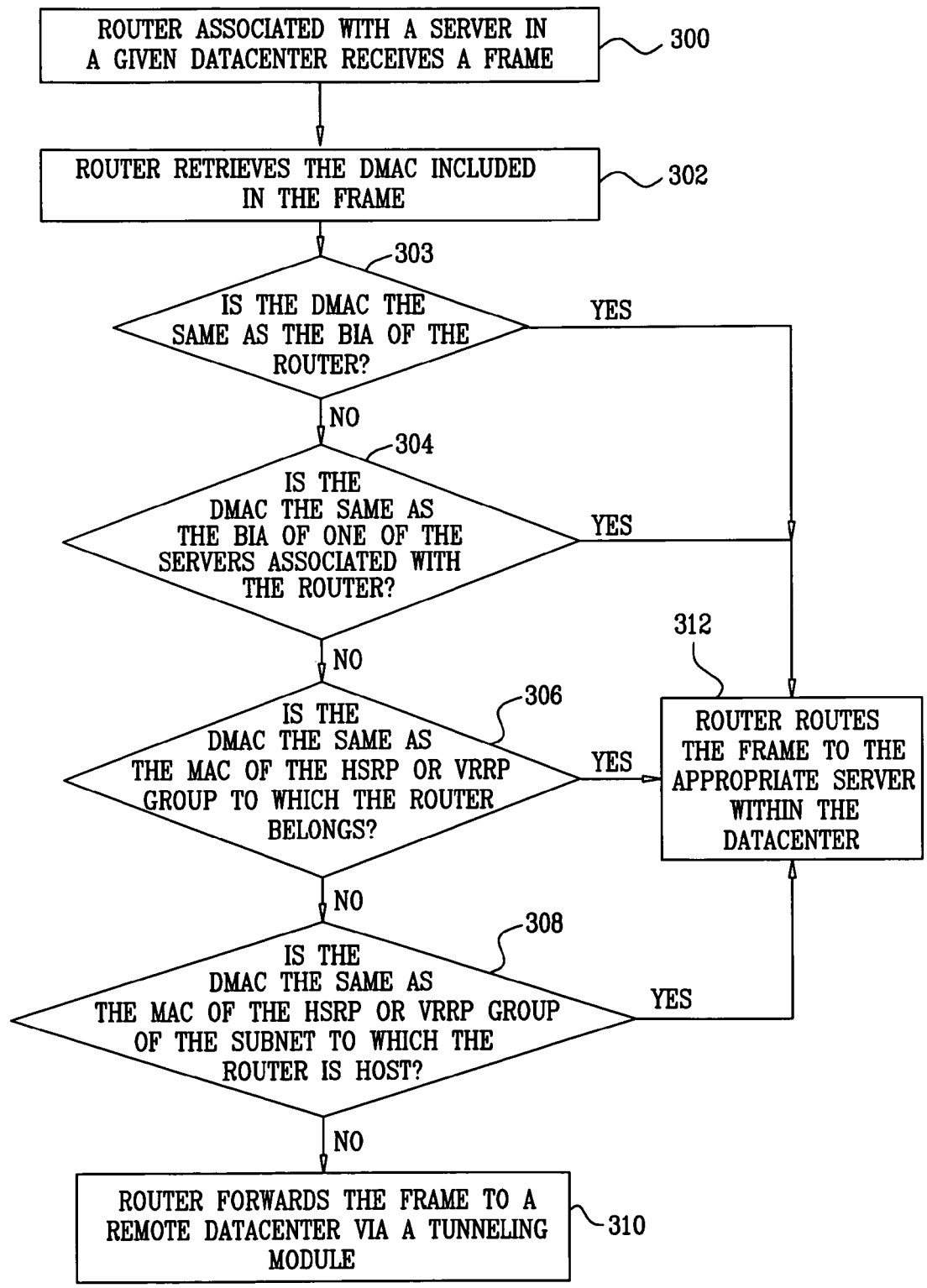

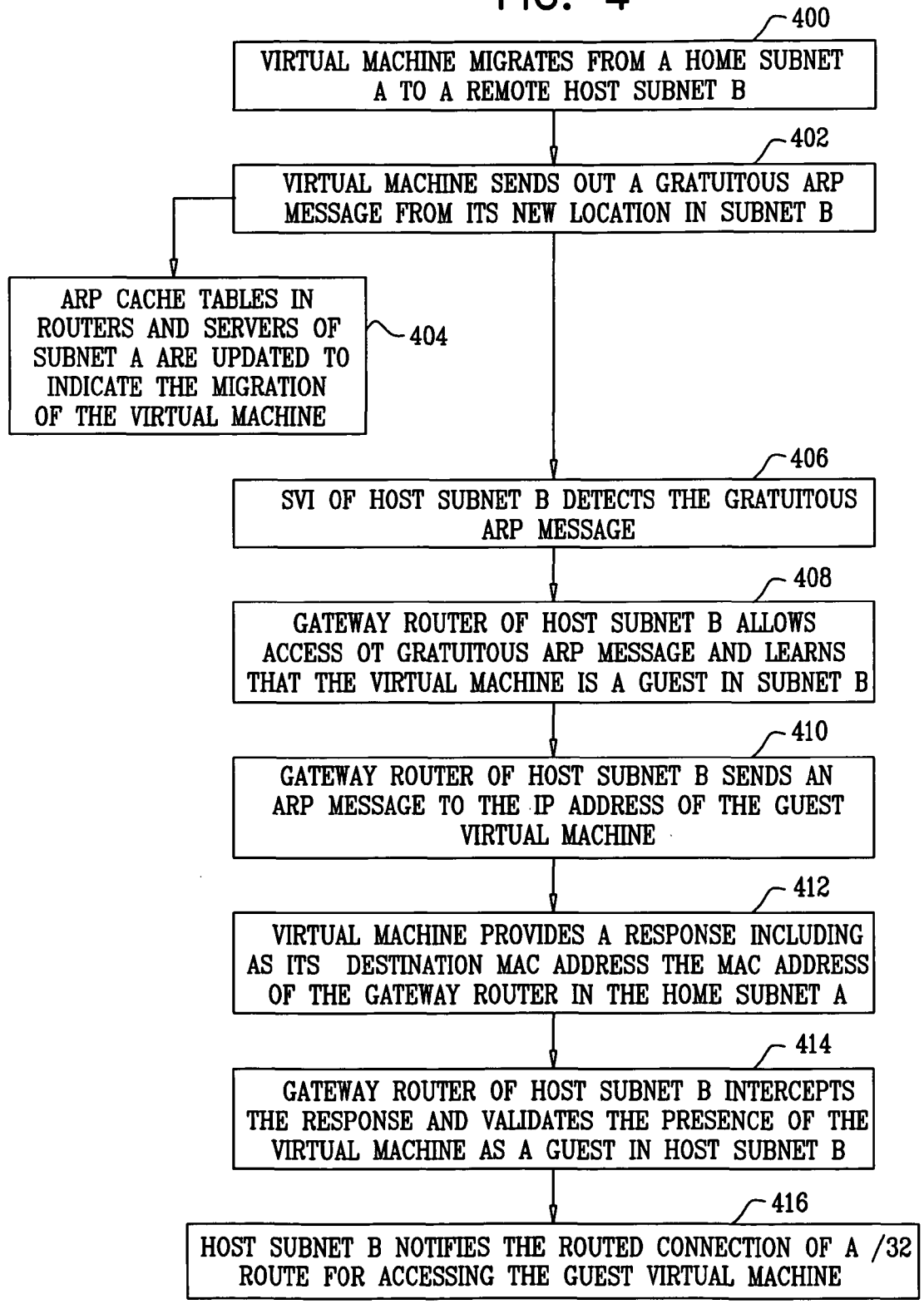

EXTENDED SUBNETS

TECHNICAL FIELD

The present disclosure relates generally to methods and systems for routing data in networks including multiple datacenters.

BACKGROUND OF THE INVENTION

Many enterprises have networks which include multiple datacenters, each datacenter including a plurality of servers and a Virtual Local Area Network (VLAN) connecting those servers. Oftentimes, servers in different ones of the datacenters need to communicate with one another. Therefore, routable communication between datacenters is desirable in such networks. Additionally, in such networks, it may be beneficial to allow communication between servers belonging to a single high availability cluster which are located in different datacenters as well as server virtualization and virtual machine migration.

The invention will be more fully understood from the following detailed description of embodiments thereof, taken together with the drawings in which:

BRIEF DESCRIPTION OF THE DRAWINGS

FIG. 3 is a simplified flowchart that schematically illustrates one example of traffic forwarding logic useful in the communications networks of FIGS. 1 and 2; and FIG. 4 is a simplified flowchart that schematically illustrates the operation of a migration detection and notification module and of a routing module included in the communications networks of FIGS. 1 and 2.

DESCRIPTION OF EXAMPLE EMBODIMENTS

Overview

Figure 1:
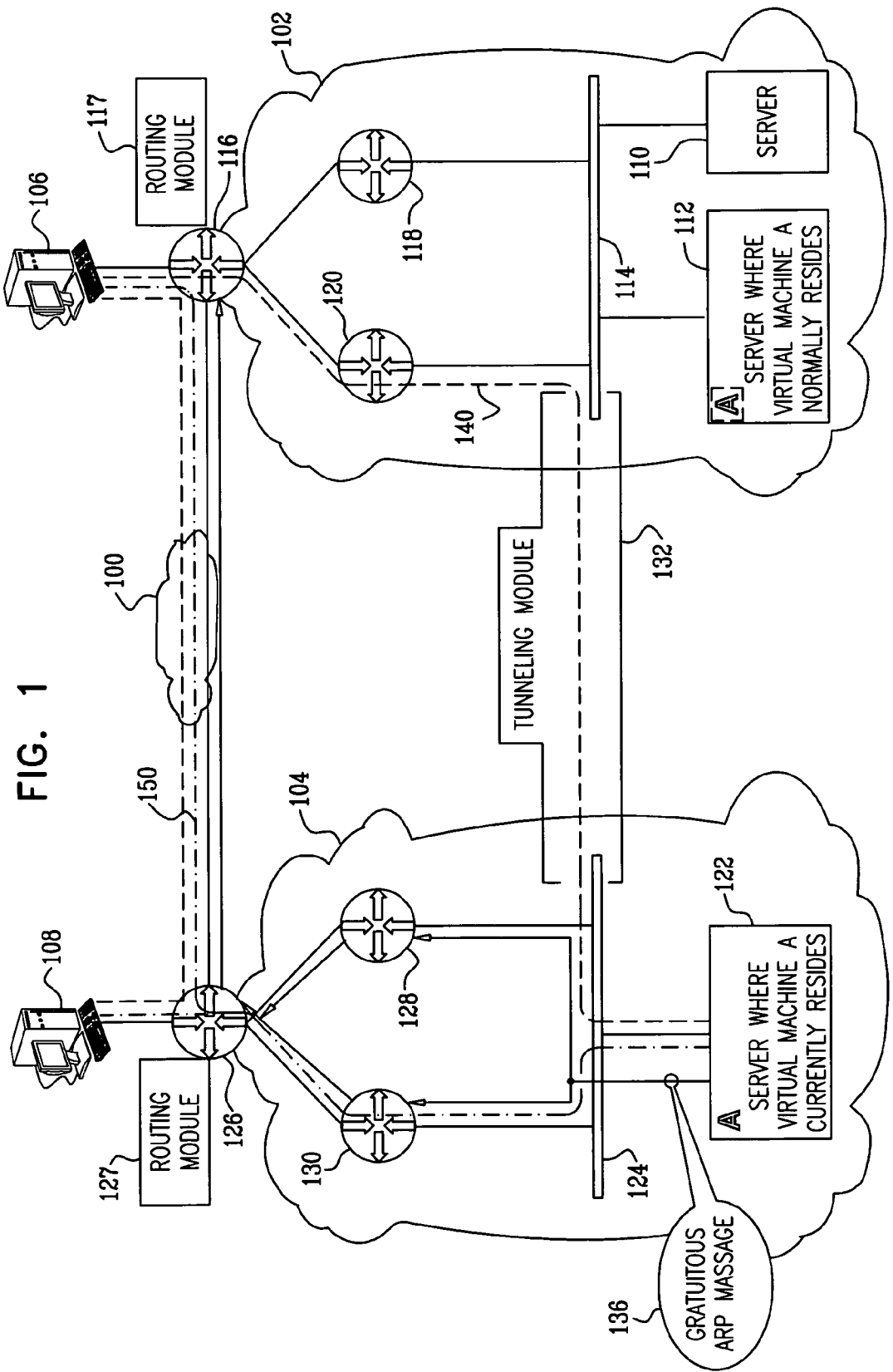
FIG. 1 is a simplified drawing illustrating a communications network including a plurality of datacenters, in accordance with an embodiment of the invention, in the context of application failover between datacenters.

Embodiments of the invention provide methods and systems for routing data in networks including multiple datacenters, particularly when direct communication between servers located in two different datacenters is desired.

In some embodiments, a tunneling module is formed, connecting VLANs of different datacenters included in the network. In accordance with some embodiments a datacenter includes a router which comprises a frame receiving module operative to receive a traffic frame including a Destination Media Access Control (DMAC) address and a frame forwarding module operative to forward the received traffic frame to a second router in a second datacenter via the tunneling module if the DMAC address included in the received traffic frame is different from all of the following:

a Burned in Address of the router;

a Burned in Address of at least one server associated with the router;

a Media Access Control (MAC) address of one of a Hot Standby Routing Protocol (HSRP) group and a Virtual Router Redundancy Protocol (VRRP) group of the router; and a MAC address of one of a HSRP group and a VRRP group of a subnet hosted by the router.

In other embodiments, a tunneling module is formed, connecting VLANs of different datacenters included in the network. A given datacenter detects the presence of a foreign virtual address, which has migrated to the given datacenter from another via the tunneling module, by receiving a gratuitous Address Resolution Protocol (ARP) message or a reverse ARP message from the migrated virtual address. The given datacenter employs the received message to determine the presence of the virtual address in given datacenter and validates such presence. The given datacenter notifies other datacenters in the network of the presence therein of the foreign virtual address, and subsequently the other datacenters direct requests for the virtual address directly to its current location in the given datacenter.

In additional embodiments, the tunneling module enables direct communication between servers belonging to a single high availability cluster, even if these servers are located in different datacenters.

It is appreciated that in the context of the invention, the term 'virtual address' is interpreted broadly and includes a virtual machine address and a cluster virtual IP address or any server IP address that is susceptible to migration.

It is further appreciated that in the context of the present application, the term gratuitous ARP refers to a request packet in which the source IP address and the destination IP address are both set to the IP address of the machine issuing the packet, and the destination Media Access Control (MAC) address is set to be the broadcast address. A gratuitous ARP request and reply are used to inform network neighbors of changes in the MAC address associated with a given IP address, thereby enabling machines receiving the gratuitous ARP packet to update their ARP tables with the new MAC address of the given IP address.

The methods and systems described herein can be used in various network devices, such as Shared Port Adapters (SPAs) Interface Processor cards including for example SIP400 and SIP600 available from Cisco, which include tunneling techniques. Additionally, the methods and systems described herein may be used with a Server Virtualization Switching (SVS) system, an Internet Operating System (IOS), and a Nexus Operating System (NXOS).

Example Embodiments

Reference is now made to FIG. 1, which is a simplified drawing illustrating a communications network including a plurality of datacenters, in accordance with an embodiment of the invention, in the context of application failover between datacenters.

As seen in FIG. 1, a routed connectivity network interconnects a plurality of datacenters, such as a Wide Area Network (WAN) 100, including datacenter 102 and datacenter 104, as well as client computers 106 and 108. As seen, datacenter 102 includes servers 110 and 112, which are communicably connected to each other via a Virtual Local Area Network (VLAN) 114, thereby defining a first subnet. A router 116, having associated therewith a routing module 117, connects datacenter 102 with the WAN 100. Datacenter 102 additionally includes two redundant routers 118 and 120, which function as default gateways for servers 110 and 112, and connect the VLAN 114 with the WAN 100 via router 116. However, it is appreciated that the datacenter may include only one of routers 118 and 120.

It is appreciated that the connection of redundant routers 118 and 120 to the WAN 100, via router 116, allows for summarization of servers 110 and 112, by enabling the display to the WAN 100 of an aggregated IP address subnet, which includes the first subnet, for accessing both servers 110 and 112.

In a similar manner, datacenter 104 includes a server 122, which is connected to a VLAN 124, thereby defining a second subnet. A router 126, having associated therewith a routing module 127, connects datacenter 104 with the WAN 100. Datacenter 104 additionally includes two redundant routers 128 and 130, which function as default gateways for server 122, and connect the VLAN 124 with the WAN 100 via router 126. However, it is appreciated that the datacenter may include only one of routers 128 and 130.

It is appreciated that routers 118 and 120 define a first group in accordance with the Hot Standby Router Protocol (HSRP), which is described in RFC 2281, or in accordance with the Virtual Router Redundancy Protocol (VRPP), which is described in RFC 2338 which are hereby incorporated by reference. Similarly, routers 128 and 130 define a second HSRP or VRRP group.

As seen, a tunneling module 132 communicably connects VLAN 114 and VLAN 124, thereby enabling communication between the first and second subnets and between servers 112, 122 and 110, and failover of virtual addresses from one datacenter to another. The tunneling module 132 may employ any existing tunneling mechanism or optical transport technology, such as Layer 2 Tunneling Protocol version 3 (L2TPv3), Ethernet over Multiprotocol Label Switching (EoMPLS), Virtual Private LAN Service (VPLS), Ethernet over Multiprotocol Label Switching over General Routing Encapsulation (EoMPLSoGRE) and Wavelength Division Multiplex (WDM) technology.

In the illustrated embodiment, a virtual machine A, which normally resides in server 112 in datacenter 102, failed over to datacenter 104, and currently resides in server 122. In the following description, server 112 and datacenter 102 will be referred to respectively as the home server and datacenter for virtual machine A. Similarly, server 122 and datacenter 104 will be referred to as host server and datacenter for virtual machine A, and virtual machine A will be considered a guest on its host server and datacenter.

As described in further detail hereinbelow with reference to FIG. 4, the migration of virtual machine A from server 112 to server 122 is detected by elements of datacenter 102 and of datacenter 104. Detection of the migration of virtual machine A from server 112 to server 122 is initialized by the virtual machine A sending out a gratuitous Address Resolution Protocol (ARP) message or a reverse ARP message, indicated by reference numeral 136, from its new location in server 122, which gratuitous ARP may be felt in the datacenters 102 and 104, as indicated by a dotted line. Subsequently, the ARP cache tables in the routers and servers of datacenter 102 are updated to indicate the migration of the virtual machine.

The routers of datacenter 104, which are appropriately configured, allow access to the gratuitous ARP message, thus allowing datacenter 104 to learn that the virtual machine A is currently a guest therein.

Subsequently, a router in datacenter 104, such as router 130 notifies router 126 of a host route, which is preferably a /32 route, for accessing the virtual machine which is hosted in datacenter 104. This may be done in any suitable way known in the art, such as in a similar manner to the operation of Route Health Injection or Local Area Mobility, which are described hereinabove in the Background Of The Invention.

It is appreciated that following notification of the /32 route for the migrated virtual machine, communication between servers in the datacenter 102 and the migrated virtual machine which is hosted in datacenter 104 continues similarly to the way it proceeded prior to migration of the virtual machine.

Requests for virtual machine A, received from client computers 106 and 108 prior to establishment by routing modules 117 and 127 of the new location of virtual machine A, are initially transmitted via router 116 and VLAN 114 to server 112, at which virtual machine A normally resides, and following establishment that virtual machine A has failed over to server 122 in datacenter 104, the request is forwarded to server 122 via tunneling module 132, as indicated by dashed line 140.

It is a particular feature of the invention that following establishment by routing modules 117 and 127 of the new location of virtual machine A, requests for virtual machine A are forwarded directly to gateway router 126 and therefrom to server 122, at which the virtual machine A currently resides, as indicated by dashed-dotted line 150.

The logic for forwarding traffic from one datacenter to another via the tunneling module 132 is described in detail hereinbelow with reference to FIG. 3.

It is appreciated that the tunneling module 132 may provide a full communication connection between VLAN 114 and VLAN 124, such that all broadcasts generated in VLAN 114 are visible in VLAN 124, and vice versa. Alternately, tunneling module 132 may include multiple secondary tunnels (not shown), each of the secondary tunnels allowing communication only between servers, located the two datacenters 104 and 102, but which servers belong to a given group, such as a high availability cluster.

It is further appreciated that routers 130 and 128 in datacenter 104 and routers 120 and 118 in datacenter 102 may be configured for functioning with the tunneling module 132 by including a definition of remote datacenters and subnets. In the embodiment of FIG. 1, routers 128 and 130 include a definition of the IP address of datacenter 104, and routers 120 and 118 include a definition of the IP address of datacenter 102.

It is appreciated that though the description of FIG. 1 relates to two datacenters, the system would function in the same manner if three or more datacenters were included therein. In such a case, a virtual address would have a single home subnet and server, and could be hosted in multiple subnets.

Figure 2:
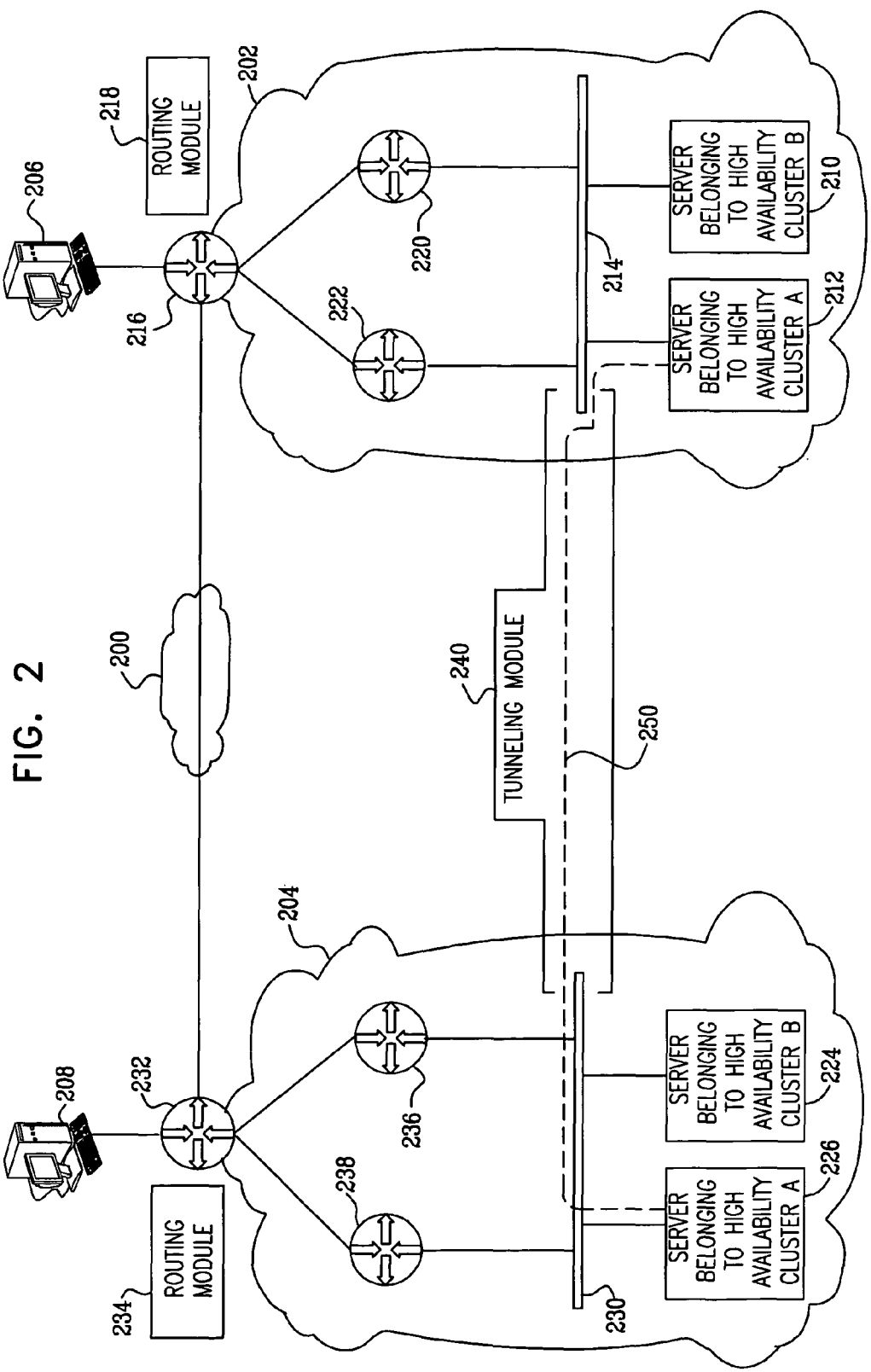
FIG. 2 is a simplified drawing illustrating a communications network including a plurality of datacenters, in accordance with an embodiment of the invention, in the context of high availability clusters spanning multiple datacenters.

Reference is now made to FIG. 2, which is a simplified illustrative drawing illustrating a communications network including a plurality of datacenters, constructed and operative in accordance with an embodiment of the invention, in the context of high availability clusters spanning multiple datacenters.

As seen in FIG. 2, routed connectivity network interconnects a plurality of datacenters, such as a WAN 200, including datacenter 202 and datacenter 204, as well as client computers 206 and 208. As seen, datacenter 202 includes servers 210 and 212, which are communicably connected to each other via a VLAN 214, thereby defining a first subnet. A router 216, having associated therewith a routing module 218, connects datacenter 202 with the WAN 200. Datacenter 202 additionally includes two redundant routers 220 and 222, which function as default gateways for servers 210 and 212 and connect the VLAN 214 with the WAN 200 via router 216. However, it is appreciated that the datacenter may include only one of routers 220 and 222.

It is appreciated that the connection of redundant routers 220 and 222 to the WAN 200 via router 216, allows for summarization of servers 210 and 212, by enabling the display to the WAN 200 of a range of IP addresses which includes the first subnet.

In a similar manner, datacenter 204 includes servers 224 and 226, which are connected to a VLAN 230, thereby defining a second subnet. A router 232, having associated therewith a routing module 234 connects datacenter 204 with the WAN 200. Datacenter 204 additionally includes two redundant routers 236 and 238 which function as default gateways for servers 224 and 226 and connect the VLAN 230 with the WAN 200 via router 232. However, it is appreciated that the datacenter may include only one of routers 236 and 238.

It is appreciated that the connection of redundant routers 236 and 238 to the WAN 200 via gateway router 232, allows for summarization of servers 236 and 238, by enabling the display to the WAN 200 of a single IP address range, which includes the second subnet.

It is further appreciated that routers 220 and 222 define a first HSRP or VRRP group and routers 236 and 238 define a second HSRP or VRRP group.

As seen, a tunneling module 240 communicably connects VLAN 214 and VLAN 230, thereby enabling communication between the first and second subnets and between servers 212 and 226 which belong to high availability cluster A, and between servers 210 and 224 which belong to high availability cluster B. This is particularly important for providing communication between servers located in different datacenters, which servers belong to a single high availability cluster, such as cluster A and cluster B in the illustrated example. The tunneling module 240 may employ any existing tunneling mechanism or optical transport technology, such as Layer 2 Tunneling Protocol version 3 (L2TPv3), Ethernet over Multiprotocol Label Switching (EoMPLS), Virtual Private LAN Service (VPLS), Ethernet over Multiprotocol Label Switching over General Routing Encapsulation (EoMPLSoGRE) and Wavelength Division Multiplex (WDM) technology.

In the illustrated embodiment, servers 212 and 226 belong to high availability cluster A and servers 210 and 224 belong to high availability cluster B. Servers 212 and 226, communicate with each other directly, via VLAN 214, tunneling module 240, and VLAN 230, as indicated by dashed line 250.

It is appreciated that the tunneling module 240 may provide a full communication connection between VLAN 214 and VLAN 230, such that all broadcasts generated in VLAN 214 are visible in VLAN 230, and vice versa. Alternately, tunneling module 240 may include multiple secondary tunnels (not shown), each of the secondary tunnels allowing communication only between servers, located in different datacenters, but which servers belong to a given group, such as a high availability cluster.

It is further appreciated that routers 236, 238, 220, and 222 are configured for functioning with the tunneling module 240, by including a definition of remote datacenters and subnets. In the embodiment of FIG. 2, routers 220 and 222 include a definition of the IP address of datacenter 204, and routers 236 and 238 include a definition of the IP address of datacenter 202.

The logic for forwarding traffic from one datacenter to another via the tunneling module 240 is described in detail hereinbelow, with reference to FIG. 3.

It is appreciated that though the description of FIG. 2 relates to two datacenters, the system would function in the same manner if three or more datacenters were included therein. In such a case, a high availability cluster may include servers located in three or more datacenters, and all the servers of the high availability cluster would communicate via the tunneling module.

Reference is now made to FIG. 3, which is a simplified flowchart that schematically illustrates one example of traffic forwarding logic useful in the communications networks of FIGS. 1 and 2.

As seen in FIG. 3, a frame, which includes in it a Destination Media Access Control (DMAC) address, is received at a router, associated with a server in a given datacenter, such as router 118 associated with server 110 in datacenter 102 (FIG. 1), as seen in step 300, and the router retrieves the DMAC address from the frame in step 302.

The router checks whether the DMAC address included in the frame is different from its own Burned In Address (BIA), as seen at decision step 303. If the DMAC address is different from the BIA of the router, the router proceeds to check whether the DMAC address included in the frame is different from the BIA of one of the servers associated therewith, as seen at decision step 304.

If in step 304 the DMAC address is different from the BIA of the server, the router proceeds to check whether the DMAC address included in the received frame is different from the Media Access Control (MAC) address of the HSRP or VRRP group to which it belongs, at decision step 306. If in step 306 the DMAC address is different from the MAC address of the HSRP or VRRP group to which the router belongs, the router proceeds to check whether the DMAC address included in the received frame is different from the MAC address of the HSRP or VRRP group of the subnet to which the router is a host, at decision step 308.

As seen in step 310, if all the conditions checked in decision steps 303, 304, 306 and 308 are not fulfilled, and the DMAC address is different from the MAC address of the HSRP or VRRP group of the subnet which is hosted by the router, the frame is forwarded to a remote datacenter, such as datacenter 104 (FIG. 1) via a tunneling module, such as tunneling module 132 (FIG. 1).

Otherwise, if the DMAC address of the frame is the same as the BIA of the router or the same as the BIA of one of the servers associated with the router receiving the frame, or if the DMAC address of the frame is the same as the MAC address of the HSRP or VRRP group including the router or of the HSRP or VRRP group of the subnet hosted by the router, the frame is routed to the server within the given datacenter or to the WAN as required by the routing table, and is not forwarded to a remote datacenter, as seen in step 312.

Thus, frames are forwarded in the tunnel only if they are actually intended for a MAC address which is not associated with the home or host router HSRP or VRRP group at which the frames were received, and traffic which is intended for the given datacenter or HSRP or VRRP group remains local.

Additionally, rules are imposed on the WAN, routing functionalities, and HSRP or VRRP groups, in order to ensure that all traffic in a given datacenter does not unnecessarily get bridged over to a remote datacenter via the tunneling module 132.

Reference is now made to FIG. 4, which is a simplified flowchart that schematically illustrates the operation of a migration detection and notification module and of a routing module included in the communications networks of FIGS. 1 and 2, in accordance with an embodiment of the invention.

As seen in step 400 of FIG. 4, a virtual machine initially migrates from a home subnet A, such as the subnet of datacenter 102 (FIG. 1), to a remote subnet B, such as the subnet of datacenter 104 (FIG. 1), which remote subnet B functions as a host subnet for the virtual machine. The virtual machine is considered a guest on remote subnet B.

As seen in step 402, the virtual machine sends out a gratuitous Address Resolution Protocol (ARP) message or a reverse ARP message, from its new location in subnet B. The gratuitous ARP may be felt in the home subnet and in the host subnet. Subsequently, the ARP cache tables in the routers and servers of subnet A are updated to indicate the migration of the virtual machine, as seen in step 404.

In step 406, the Switch Virtual Interface (SVI) of the host subnet, subnet B, detects the gratuitous ARP message which is received from a virtual machine which normally does not belong to subnet B and is foreign thereto. Due to appropriate configuring of routers, such as routers 128 and 130 (FIG. 1), connecting subnet B to a main subnet router, such as router 126 (FIG. 1), the routers allow access to the gratuitous ARP message, thereby learning that a virtual machine is currently a guest in subnet B, as seen in step 408.

Preferably, the routers, such as routers 130 and/or 128 (FIG. 1) validate the presence of the virtual machine in subnet B by sending an ARP message to the IP address of the guest virtual machine, as seen in step 410. Typically, this ARP message includes as its source address the IP address of the SVI of subnet A, which is the home subnet for the virtual machine, such that the virtual machine can respond to the ARP message.

As seen in step 412, the virtual machine which is a guest in subnet B provides a response to the ARP message which includes as its destination MAC address the MAC address of the gateway router in its home subnet, subnet A.

In accordance with the forwarding logic described hereinabove with reference to FIG. 3, the response is not forwarded to the home subnet of the virtual machine. However, the presence in subnet B of a guest virtual machine, which normally resides in subnet A, is now established, as seen at step 414.

Subsequently, as seen at step 416, a router on the host subnet, such as router 130 or 128 (FIG. 1), notifies a central router of the subnet, such as router 126 (FIG. 1), and thereby notifies the routed connection in which the central router of the subnet is included, such as WAN 100 (FIG. 1), of a host route, which is preferably a /32 route, for accessing the virtual machine which the router is hosting. This may be done in any suitable way known in the art, such as in a similar manner to the operation of Route Health Injection or Local Area Mobility, which are described hereinabove in the Background Of The Invention.

It is appreciated that following notification of the /32 route for the migrated virtual machine, communication between servers in the home subnet and the migrated virtual machine which is hosted on subnet B continues to similarly to the way it proceeded prior to migration of the virtual machine.

Specifically, if a server in the home subnet, such as server 112 in datacenter 102, needs to communicate with the migrated virtual machine, it sends an ARP request for the virtual machine. The ARP request and response typically travel through the tunneling module, as illustrated in FIG. 2.

It will be appreciated by persons skilled in the art that the invention is not limited to what has been particularly shown and described hereinabove. Rather the scope of the invention includes both combinations and subcombinations of various features described hereinabove as well as modifications of such features which would occur to a person of ordinary skill in the art upon reading the foregoing description and which are not in the prior art.

The invention claimed is:

1. A router for use in a datacenter, comprising:
  detection means for detecting at least one of a gratuitous Address Resolution Protocol (ARP) message and a reverse ARP message, sent by a virtual address which migrated from another datacenter to said datacenter and is foreign thereto;
  validation means for validating the presence of said virtual address by sending an ARP message to said virtual address and by receiving a response message from said virtual address which response includes as a destination address a Media Access Control (MAC) address of a router in said another datacenter.

2. A router according to claim 1 and also comprising notification means operative to notify at least one other router of a host route for accessing said virtual address.

3. A router according to claim 2 and wherein said host route comprises a /32 route.

4. A router according to claim 2 and wherein said at least one other router comprises another router in said datacenter.

5. A router according to claim 2 and wherein said at least one other router comprises a router in at least one other datacenter.

6. A method for transmitting data in a communications system including a plurality of datacenters, the method comprising:
  connecting Virtual Local Area Networks (VLANs) of the plurality of datacenters using a tunneling module;
  in a first datacenter, detecting the presence of virtual address which previously resided in a second datacenter but has migrated to said first datacenter, said detecting including:
    at said first datacenter, receiving from said virtual address at least one of a gratuitous Address Resolution Protocol (ARP) message and a reverse ARP message;
    employing said at least one of a gratuitous ARP message and a reverse ARP message to determine the presence of said virtual address in said first datacenter; and
    validating the presence of said virtual address in said first datacenter, said validation comprising sending from said first datacenter an ARP message to said virtual address and, at said first datacenter, receiving a response from said virtual address identifying said second datacenter;
  notifying said plurality of datacenters of the presence of said virtual machine in said first datacenter; and
  following said notifying, at each of said plurality of datacenters, directing requests for said virtual address directly to a server in said first datacenter.

7. A method according to claim 6 and wherein said validating comprises:
  sending from said first datacenter an ARP message to said virtual address; and
  at said first datacenter, receiving a response from said virtual address including a Media Access Control (MAC) address belonging to said second datacenter.

8. A method according to claim 7 and wherein said sending comprises sending an ARP message, including, as its source address, an IP address of a Switch Virtual Interface (SVI) associated with said second datacenter.

9. A method according to claim 6 and wherein said notifying comprises providing a notification of a host route for accessing said virtual address from said first datacenter to said plurality of datacenters via a routed connection interconnecting said plurality of datacenters.

10. A method according to claim 9 and wherein said host route comprises a /32 route.

11. A method according to claim 6 and also comprising:

at said second datacenter, receiving said at least one of a gratuitous ARP message and a reverse ARP message; and updating at least one ARP cache table in said second datacenter to indicate the migration of said virtual address.

12. A method according to claim 6 and wherein said detecting is carried out by a Switch Virtual Interface (SVI) associated with said first datacenter.

13. A method according to claim 6 and wherein said directing comprises:

at a given router in one of said plurality of datacenters, receiving a traffic frame designating said virtual address; and forwarding said traffic frame to a router in said first datacenter via said tunneling module if a Destination Media Access Control (DMAC) address included in said frame is different from all of the following:

a Burned in Address of said given router;

a Burned in Address of at least one server associated with said given router;

a Media Access Control (MAC) address of one of a Hot Standby Routing Protocol (HSRP) group and a Virtual Router Redundancy Protocol (VRRP) group of said given router; and a MAC address of one of a HSRP group and a VRRP group of a subnet hosted by said given router.

14. A method according to claim 6, and also comprising employing said tunneling module for providing communication between servers, which reside in different ones of said plurality of datacenters, but which belong to a single high availability cluster.

\* \* \* \* \*